United States Patent Office 3,385,906
Patented May 28, 1968

3,385,906
PRODUCTION OF CUMENE
Stephen Kaufman, East Brunswick Township, N.J., assignor to Union Carbide Corporation, a corporation of New York
No Drawing. Filed May 25, 1965, Ser. No. 458,743
15 Claims. (Cl. 260—671)

ABSTRACT OF THE DISCLOSURE

Process for transalkylating diisopropyl benzene to cumene by reacting diisopropyl benzene and benzene in the liquid phase in the presence of a zeolitic molecular sieve catalyst and recovering cumene.

---

This invention relates to the transalkylation of diisopropyl benzene to cumene. More particularly, this invention relates to the production of cumene by the alkylation of benzene with propylene and the transalkylation of diisopropyl benzene.

Cumene, also known as isopropylbenzene, 2-phenylpropane and cumol, is a colorless liquid boiling at 152.4° C. It is an important constituent of gasoline-boiling-range motor fuels of high antiknock value. Cumene is also in demand as an intermediate in the synthesis of higher molecular weight aromatic hydrocarbons such as cymene and other polyalkylated benzene hydrocarbons containing at least one isopropyl group per molecule. More recently, cumene has become important as an intermediate in the manufacture of phenol.

Generally speaking, cumene is produced by the alkylation of benzene with propylene in the presence of an alkylation promoting catalyst under alkylation conditions. However, several by-products such as di-, tri- and tetraisopropyl benzenes are also produced in consecutive and competing reactions. These by-products can comprise from 10 to 15 percent of the benzene free alkylate. The principal by-product is diisopropyl benzene and generally comprises about 90 percent of the by-product fraction. In presently known commercial processes for the production of cumene, diisopropyl benzene is either purged from the system as waste (The Chemistry of Petroleum Hydrocarbons, vol. III, Reinhold Publishing Co., pp. 589–597 (1955)) or burned as fuel. Purging or burning diisopropyl benzene results in a serious and substantial loss in raw materials efficiency; for propylene the raw materials efficiency for presently used processes generally is about 85 percent, and for benzene it is generally about 90 percent.

It is the principal object of this invention, therefore, to provide a process for transalkylating diisopropyl benzene to cumene.

It is another object of this invention to provide a process of improved raw materials efficiency for the production of cumene by the alkylation of benzene with propylene and the transalkylation of diisopropyl benzene.

It has now been unexpectedly and surprisingly discovered by this invention that certain crystalline zeolitic molecular sieves are active catalysts which promote the transalkylation of diisopropyl benzene to cumene. The fact that these molecular sieves are active catalysts for this reaction is quite surprising and is not fully understood because other catalytic materials which are active alkylation catalysts do not promote the transalkylation of diisopropyl benzene to cumene. This is demonstrated by Control I herein. Further, and more importantly, when the transalkylation reaction of this invention is employed with a cumene process wherein benzene is alkylated with propylene, raw materials efficiencies as high as 95 percent for propylene and 97 percent for benzene are reached.

Broadly, the process of this invention for transalkylating diisopropyl benzene to cumene comprises reacting diisopropyl benzene and benzene in a molar ratio of at least 1:1 in the presence of a crystalline zeolitic molecular sieve catalyst having a silica to alumina molar ratio of at least 3.0, a pore size large enough to permit internal absorption of benzene, and not more than 90 percent of their aluminum atoms associated with monovalent cations, and recovering cumene. In a preferred embodiment, the transalkylation is carried out continuously at a catalyst factor of at least about one hour. Catalyst factor as used herein refers to reactor retention time and is defined as pounds of dry catalyst per pounds per hour of reactor feed.

In an alternate embodiment, benzene is reacted (alkylated) with propylene in the presence of an alkylation catalyst under alkylation conditions. Thereafter, a major portion, that is, at least about 80 percent, preferably at least about 95 percent, by weight of cumene is removed from the alkylation reaction effluent, and the effluent is combined with benzene such that the molar ratio of diisopropyl benzene-to-benzene is within the range of from about 1:1 to about 1:10. The resultant feed stream is then transalkylated as described above and cumene is recovered.

The term "zeolite," in general, refers to a class of natural and synthetic hydrated metal aluminosilicates, many of which are crystalline. These zeolites are distinguishable on the basis of their composition, crystal structure as determined by X-ray powder diffraction patterns, and adsorption properties.

Crystalline zeolites structurally consist basically of an open three dimensioned framework of $SiO_4$ and $AlO_4$ tetrahedra which are crosslinked by the sharing of oxygen atoms in a manner such that the ratio of oxygen atoms to the total of aluminum and silicon atoms is equal to two, i.e., $O/(Al\text{-}Si)=2$. The alumina tetrahedra have a negative electrovalence which normally is balanced by the inclusion of cations within the crystal. This balance may be expressed by the formula $2Al/(2Na, 2K, 2Li, Ca, Ba, Sr, \text{etc.})=1\pm0.15$. The cations are located in the vicinity of the $AlO_4$ tetrahedra, but their exact location depends upon their valency or size. Further, these cations may be replaced by other cations by suitable exchange techniques without inducing appreciable changes in the anionic framework.

Certain crystalline zeolites have interstices of molecular dimensions which are generally occupied by water of hydration. On dehydration of these zeolites, channels are formed which communicate to the surface through orifices of molecular dimensions in the crystal lattice. These dehydrated crystalline zeolites, or molecular sieves, can be employed to separate mixtures of molecules of different size and/or shape because certain molecules can pass through the orifices and be retained in the interstitial space, whereas other larger molecules cannot pass through.

Suitable molecular sieves for use herein are characterized by a pore size large enough to permit internal adsorption of benzene, a silica to alumina ratio of at least 3.0 and a $M_2O/Al_2O_3$ molar ratio of less than about 0.9, wherein M is a monovalent metallic cation, for example sodium or potassium, with the remaining aluminum atoms being associated with polyvalent cations and/or unassociated with metal cations.

Pore size is important to catalytic activity because the pores must be larger than the molecules of the feed and the product to permit free entry of feed and desorption of the product from the structure. For the process of this invention, a pore size large enough to admit benzene has been found sufficient.

The silica-to-alumina molar ratio, a measure of the distance between the $AlO_4$ tetrahedra, is important to catalytic activity in several respects. First, the thermal stability of the crystalline structure is improved at higher silica to alumina ratios, and higher catalytic activity is observed with crystalline structures than with non-crystalline zeolites of the same chemical composition. Second, the charge distribution within a zeolite containing polyvalent metal cations is affected by the silica-to-alumina ratio. At ratios of up to about 3, such as is found in zeolite X, which is described in U.S. Patent 2,882,244, polyvalent cations will be located equidistantly between the $AlO_4$ tetrahedra, thereby equally balancing the negative charges of the tetrahedra. At ratios of greater than about 3.0, however, the $AlO_4$ tetrahedra are separated by greater distances and a polyvalent cation is more closely associated with one tetrahedron than another, thereby providing positively and negatively charged sites throughout the structure which are believed to result in improved catalytic activity in the transalkylation reaction of this invention. Finally, a high silica-to-alumina ratio permits a high degree of decationization, a state in which at least 10 percent of the aluminum ions are unassociated with cations without loss of crystallinity, and a high degree of decationization has been found to provide a molecular sieve with improved catalytic activity.

Although molecular sieves having a silica-to-alumina ratio of greater than about 3 can be employed, it is preferred that the ratio be at least 3.3, and particularly from 3.5 to 6. Crystalline zeolites having a silica-to-alumina molar ratio in excess of about 6 are less preferred because the additional $SiO_4$ tetrahedra merely function as a diluent by decreasing the $AlO_4$ concentration and, therefore, the cation density.

Finally, the concentration of monovalent cations affects the activity of the molecular sieve as a transalkylation catalyst. Thus, the activated sieve should have no more than about 90 percent of its aluminum cations associated with monovalent cations for the sieve to have appreciable catalytic activity. The reduction of monovalent cations can be achieved by ion-exchange with polyvalent cations and/or decationization. Decationization has reference to a state in which at least a portion of the aluminum atoms in the crystal structure are unassociated with any cations, as is more fully described in U.S. Patent No. 3,130,006.

Molecular sieves having the desired pore size and silica-to-alumina ratio include naturally occurring zeolites such as faujasite and synthetic zeolites such as zeolites L and Y.

Zeolite Y, which is the preferred molecular sieve for use in preparing the catalysts employed in accordance with this invention, can be described in terms of mole oxides by the formula:

(II) $0.9 \pm 0.2 Na_2O : Al_2O_3 : wSiO_2 : xH_2O$ wherein $w$ is a number having a value of greater than 3 up to about 6; and $x$ may be any value up to about 9. Additional properties, such as X-ray diffraction data, by which zeolite Y may be identified, are set forth in U.S. Patent No. 3,130,007, which is incorporated herein by reference.

In a similar manner, the chemical composition of zeolite L may be represented by the formula:

(III) $1.0 \pm 0.1 M_{2/s}O : Al_2O_3 : 6.4 \pm 0.5 SiO_2 : yH_2O$ wherein M is at least one exchangeable cation; $s$ is the valence of the exchangeable cation; and $y$ is a number having a value of from 0 to 7. Zeolite L is more fully described in U.S. Patent No. 3,130,006.

By the term "exchangeable cation," as employed herein is meant a cation which can be replaced by another cation by the known ion exchange techniques without causing a substantial alteration of the basic crystal structure of the zeolite. Exchangeable cations include mono-, di-, tri- and tetravalent ions, particularly those of the metals of Groups I, II and III of the Periodic Table, as set forth in Webster's New Collegiate Dictionary, 1956 ed., p. 626. As examples of exchangeable cations one can mention barium, calcium, cerium, lithium, magnesium, potassium, sodium, zinc, hydrogen, ammonium and the like.

As indicated above, the catalyst employed in the process of this invention fall into two general classes: (1) molecular sieves in which all the aluminum atoms are associated with metal cations and at least 10 percent are associated with polyvalent cations, and (2) molecular sieves in which at least 10 percent of the aluminum atoms are unassociated with cations; i.e., at least 10 percent decationized. In the latter class, the cations may be monovalent, but it is preferred that at least another 10 percent of the aluminum atoms be associated with polyvalent cations; i.e., that no more than 80 percent of the aluminum atoms are associated with monovalent cations.

The polyvalent cations are introduced into the molecular sieve by conventional techniques, as by an ion exchange process wherein a molecular sieve is contacted with an aqueous solution containing one or more different polyvalent ions. Suitable polyvalent ions include aluminum, barium, beryllium, cadmium, calcium, cerium, cobalt, chromium, magnesium, manganese, nickel, strontium, zinc and the like.

Although a degree of exchange of 10 percent is sufficient to provide a catalyst, it is preferred that at least 40 percent of monovalent cations, and especially at least 65 percent of monovalent cations, be replaced by polyvalent cations. In other words, preferred catalysts are those wherein less than 60 percent, and most preferably less than 35 percent, of the aluminum atoms are associated with monovalent cations.

Decationization is effected by exchanging the metal cations with non-metal cations, such as a proton or the ammonium ion, which can be removed from the zeolite by heating, followed by a heat treatment, generally at a temperature of from 300° C. to 600° C. This technique is more fully described in U. S. Patent No. 3,130,006. Preferred as catalysts are those sieves which are at least 40 percent decationized, with molecular sieves which are at least 85 percent decationized being especially preferred.

A preferred class of decationized molecular sieves are those which, in addition to having at least 10 percent aluminum atoms unassociated with cations, have at least 10 percent of the aluminum atoms associated with polyvalent cations. In this embodiment, it is preferred that less than 60 percent, and, most preferably, less than 15 percent, of the aluminum atoms be associated with monovalent cations and that from 25 to 70 percent, most preferably from 35 to 65 percent, of the aluminum atoms be associated with polyvalent cations.

Molecular sieves of this type are readily prepared by (1) exchanging the monovalent ions with non-metallic ions, such as the ammonium ion; (2) back-exchanging the resulting zeolite with polyvalent ions; and (3) heating to decompose the remaining non-metallic ions and decationize the zeolite.

Of course all the zeolites must be activated by at least partially removing the water of hydration to form the molecular sieve. This is readily effected by heating the hydrated zeolite at temperatures in the range of about 200° C. to about 700° C. with or without a vacuum. Decationized molecular sieves, when prepared in the manner as described above, will already be activated, for water of hydration will be removed during the decationization heating cycle.

It is preferred that the molecular sieve catalyst be in an agglomerated or pelletized form when employed in the process of this invention. Agglomeration is preferably effected after polyvalent metal cation exchange but prior to decationization. Additives, such as clays, alumina and silica, and fugitive compounds, such as starches, sugars and graphite, which are combusted or volatilized on heating, may be admixed with the molecular sieve prior to pelletizing or agglomeration to modify the physical properties of the pellet, such as porosity or strength, to aid in the reaction system, to enhance catalyst regeneration, or to reduce the cost of the catalyst system.

The transalkylation reaction of this invention is conducted at temperatures of from about 130° C. to about 250° C. At temperatures lower than about 130° C. the reaction does not produce satisfactory yields while at temperatures above about 250° C., undesirable impurities are formed. For maximum raw materials efficiency, it is preferred to conduct the transalkylation reaction at temperatures of from about 160° C. to about 170° C.

In the transalkylation reaction, pressures ranging from about 75 p.s.i.g. to about 450 p.s.i.g., preferably from about 95 p.s.i.g. to about 145 p.s.i.g., are essential to maintain a liquid phase system.

In the transalkylation reaction of this invention, it is essential that the molar ratio of benzene-to-diisopropyl benzene be not less than 1:1. At lower molar ratios, it has been found that transalkylation to any significant degree does not take place.

In the present invention, the presence of cumene during the transalkylation reaction can be tolerated, but its presence should not materially affect the rate of reaction between benzene and diisopropyl benzene. As indicated previously, this can be insured by removing a major portion, that is at least about 80 percent, preferably at least about 95 percent, by weight of cumene from the transalkylation reaction feed prior to transalkylating.

The transalkylation reaction of this invention can be carried out on a batch, semicontinuous or continuous basis. As indicated previously, the presence of cumene can be tolerated. It should be understood the cumene need not be present during the transalkylation reaction as would normally be the case in a batch process. If there is too much cumene present, as would occur when the effluent from an alkylation reaction is used as the transalkylation reaction feed stream, a major portion of the cumene should be removed. This can be conveniently accomplished by stripping off cumene from the effluent by distillation, absorption, and like techniques.

The transalkylation process of this invention can be used to advantage in a process for producing cumene by the alkylation of benzene with propylene. This results in a substantial increase in raw materials efficiency heretofore unattainable in processes for producing cumene. Generally speaking, the transalkylation process described herein can be employed in a batch, semicontinuous or continuous cumene process whereby benzene is alkylated with propylene in the presence of an alkylation catalyst under alkylation conditions.

One example of such a cumene process comprises contacting benzene and propylene in a molar ratio of from 3:1 to 8:1 with a solid phosphoric acid alkylation catalyst at a temperature of from 204° C. to 260° C. and a pressure of from 25 to 60 atmospheres as is taught by E. K. Jones et al. in U. S. Patent 2,860,173.

Another cumene process comprises condensing benzene with propylene in the presence of a mixture of an aluminum halide, a titanium oxide and an alkali metal or alkaline earth metal as taught by Schmerling in U.S. Patent 2,882,324.

Yet another process for making cumene comprises alkylating benzene with propylene in the liquid phase in a molar ratio of at least 3:1 in the presence of an acidic silica-alumina catalyst at a temperature of from 160° to 300° C. as taught by de Keizer et al. in U.S. Patent 2,897,246.

Still another cumene process comprises contacting benzene and propylene in the presence of a crystalline metallic alumino-silicate catalyst at a temperature of from 300° to 850° F. as taught by Mattox et al. in U.S. Patent 2,904,607.

Another process for producing cumene comprises contacting benzene and propylene in the liquid phase in the presence of an acid-treated montmorillonite clay at a temperature between about 65° and 85° C. under atmospheric pressure as taught by Aries in U.S. Patent 2,930,819.

Yet another process for producing cumene comprises contacting benzene and propylene in the liquid phase in the presence of an acid activated, non-swellable bentonite-type clay at a temperature of from 70° to 130° C. as taught by Joris in U.S. Patent 2,945,072.

Still another process for making cumene comprises reacting benzene and propylene in the presence of a polystyrene sulfonic acid resin catalyst cross-linked with divinylbenzene at a temperature of from 220° to 375° F. and a pressure of 200 to 2000 p.s.i.g. as taught by Thomas et al., in U.S. Patent 3,017,441.

As indicated previously, the effluent from an alkylation reaction which contains cumene, diisopropyl benzene, unreacted benzene and among others, must have a major portion of the cumene removed and the molar ratio of diisopropyl benzene-to-benzene adjusted to within the ranges indicated above before it can comprise the feed stream for the transalkylation reaction. Normally cumene is stripped off and the diisopropyl benzene-to-benzene molar ratio is adjusted by adding benzene.

In a preferred embodiment, benzene and liquified propylene are combined to form a mixture comprising benzene and propylene in a molar ratio of from about 6:1 to about 14:1. This mixture is then fed to a circulating-loop type alkylation reactor as disclosed in the co-pending application of Stephen Kaufman and Richard E. Nicolson, Ser. No. 120,752, filed June 29, 1961. The alkylation reactor contains cation exchanging resin catalysts such as styrene-divinylbenzene sulfonated resins, sulfonated cross-linked styrene polymers, phenolformaldehyde sulfonic acid resins, benzene-formaldehyde-sulfonic acid resins and the like. The alkylation reactor is maintained at a temperature of from 115° C. to 150° C. under a pressure of from 180 p.s.i.g. to 225 p.s.i.g. Sufficient cation exchanging resin catalyst, preferably saturated with benzene, is used to provide a catalyst factor of at least 0.37 hour. Unreacted propylene and benzene are stripped from the alkylation reactor effluent in successive operations and recycled to the alkylation reactor. At least 95 percent of product cumene is then stripped from the alkylation reactor effluent in a third operation and the bottoms effluent combined with sufficient benzene such that the molar ratio of diisopropyl benzene-to-benzene in the stream is not less than 1:2 and passed through a transalkylation reactor maintained at 160° C. to 170° C. and under 80 p.s.i.g. to 145 p.s.i.g. pressure and packed with sufficient zeolite Y molecular sieve catalyst having not more than 90 percent of its aluminum atoms associated with monovalent cations to provide a catalyst factor of at least 1 hour. Unreacted benzene and product cumene are then recovered from the transalkylation reactor effluent.

The following examples are intended to further illustrate the present invention without limiting the same in any manner.

Examples 1–6

Diisopropyl benzene was converted to cumene by batch reactions using the following zeolitic molecular sieves as catalysts—

(A) Decationized zeolite Y molecular sieve:
    (1) Pore size, A _____ >6.6
    (2) Silica to alumina molar ratio _____ 5.0±0.2
    (3) Percent aluminum atoms unassociated with monovalent cations _____ >85

(B) Magnesium zeolite Y molecular sieve:
    (1) Pore size, A _____ >6.6
    (2) Silica to alumina molar ratio _____ 5.0±0.2
    (3) Percent aluminum atoms associated with Mg" cations _____ 75

The batch reactions were carried out using a 300 ml., heavy walled, stainless steel reactor equipped with electrical heaters and a thermocouple for temperature measurement. Agitation was accomplished by rocking the reactor. The molecular sieve catalyst was weighed and charged into the reactor which was in a dry box. A premixed solution of benzene and diisopropyl benzene was added to the molecular sieve catalyst in the reactor. The feed charge, exclusive of catalyst was 0.353 pound in each example. The reactor was sealed, removed from the dry box, and placed on a rocking device. The reactor was then heated to the desired temperature and held there for the reaction time. After completion of the reaction, the reactor was opened, the product removed and filtered. Analysis of both the feed and product was carried out by vapor phase chromatography. Results are summarized below.

| Example No. | | Molar Ratio Diisopropyl Benzene:Benzene | Reaction Temperature, °C. | Pressure, Atmospheres | Catalysts, Pounds | Reaction Time, Hours | Analysis (weight percent) | | | Percent Diisopropyl Benzene Converted To Cumene |
|---|---|---|---|---|---|---|---|---|---|---|
| | | | | | | | Benzene | Cumene | Diisopropyl Benzene | |
| 1 | {Feed / Product} | 1:2 | 145 | 5 | A¹, 0.0645 | 24 | 50.9 / 34.6 | 0.02 / 47.1 | 48.6 / 16.8 | 65 |
| 2 | {Feed / Product} | 1:2 | 145 | 5 | A, 0.115 | 24 | 50.9 / 33.4 | 0.03 / 48.2 | 48.4 / 15.9 | 67 |
| 3 | {Feed / Product} | 1:2 | 250 | 30 | B, 0.099 | 24 | 50.9 / 35.8 | 0.03 / 44.5 | 48.4 / 12.5 | 74 |
| 4 | {Feed / Product} | 1:2 | 145 | 5 | A, 0.0858 | 48 | 50.2 / 34.6 | 0 / 47.7 | 48.9 / 16.8 | 65 |
| 5 | {Feed / Product} | 1:6 | 145 | 5 | A, 0.038 | 48 | 74.7 / 65.2 | 0 / 30.8 | 24.8 / 3.5 | 80 |
| 6 | {Feed / Product} | 1:10 | 145 | 5 | A, 0.0925 | 48 | 86.8 / 76.7 | 0 / 20.9 | 12.6 / 2.1 | 83 |

A¹ = Ground A.

CONTROL I

The equipment and procedure of Examples 1–6 was employed using 0.088 lb. of a crosslinked (2%) copolymer of styrene and divinyl benzene to which a large number of sulfonic acid groups are chemically attached as the catalyst. The catalyst is commercially available under the name Dowex 50X2. A dry box was not used in charging the catalyst and 0.353 lb. of reactants. The reaction was carried out under pressure at 150° C. for 24 hours. The molar ratio of diisopropyl benzene-to-benzene in the feed was 1:6. Analysis of the feed and product was as follows:

| | Benzene | Cumene | Diisopropyl Benzene | Percent diisopropyl benzene converted to cumene |
|---|---|---|---|---|
| Feed | 79.2 | 0.03 | 20.2 | |
| Product | 77.3 | 0.03 | 21.3 | 0 |

This control demonstrates that a well known, commercialy available alkylation catalyst, quite unexpectedly, did not promote the transalkylation of diisopropyl benzene to cumene.

Examples 7–9

Diisopropyl benzene was converted to cumene in a continuous reaction using the decationized zeolite Y molecular sieve catalyst described in Examples 1–6. The continuous reaction was carried out using a stainless steel progressive reactor column packed with 254 grams of decationized zeolite Y catalyst. The reactor column was equipped with a feed tank, a pump, and means to control and measure temperature. The molecular sieve catalyst was premixed with benzene in a dry box prior to charging to the reactor to exclude moisture. In operation, the reactants (feed) were charged to the feed tank and pumped downflow through the progressive reactor. Analysis of both feed and product was carried out by vapor phase chromatography. The controls illustrate the sensitivity of the transalkylation reaction to catalyst factor. Results are summarized below.

| Example No. | | Molar Ratio Diisopropyl Benzene:Benzene | Reaction Temperature, °C. | Pressure, p.s.i.g. | Catalyst Factor, lb. Cat./ lb./hr. Feed | Analysis (weight percent) | | | Percent Diisopropyl Benzene Converted To Cumene |
|---|---|---|---|---|---|---|---|---|---|
| | | | | | | Benzene | Cumene | Diisopropyl Benzene | |
| 7 | {Feed / Product} | 1:2 | 167 | 140 | 1.0 | 50.4 / 42.2 | 0.06 / 24.3 | 48.6 / 30.8 | 39 |
| 8 | {Feed / Product} | 1:2 | 162 | 140 | 1.2 | 51.0 / 43.7 | 0.06 / 28.4 | 46.4 / 24.0 | 48 |
| 9 | {Feed / Product} | 1:2 | 160 | 140 | 1.1 | 48.9 / 44.4 | 4.14 / 22.4 | 44.5 / 29.5 | 34 |
| Controls: | | | | | | | | | |
| II | {Feed / Product} | 1:6 | 160 | 140 | 0.35 | 71.7 / 71.6 | 0 / 3.3 | 27.8 / 24.4 | 12 |
| III | {Feed / Product} | 1:2 | 167 | 140 | 0.5 | 50.4 / 39.1 | 0.06 / 19.8 | 48.6 / 38.3 | 21 |
| IV | {Feed / Product} | 1:2 | 167 | 140 | 0.36 | 50.5 / 45.5 | 0.04 / 12.0 | 48.7 / 40.4 | 17 |
| V | {Feed / Product} | 1:6 | 160 | 140 | 0.42 | 71.7 / 70.8 | 0 / 5.5 | 27.8 / 22.9 | 17.5 |

I claim:
1. Process for transalkylating diisopropyl benzene to cumene which comprises reacting in the liquid phase benzene and diisopropyl benzene in a molar ratio of at least 1:1 in the presence of a zeolitic molecular sieve catalyst having a pore size large enough to permit the internal absorption of benzene, a silica-to-alumina ratio of at least 3.0 and no more than 90 percent of aluminum atoms associated with monovalent cations at a temperature of from about 130° C. to about 250° C. and a pressure of from about 75 p.s.i.g. to about 450 p.s.i.g., and recovering cumene.

2. Process of claim 1 wherein said transalkylation reaction is carried out continuously at a catalyst factor of at least about one hour.

3. Process of claim 1 wherein at least 10 percent of the aluminum atoms of said molecular sieve are associated with polyvalent metal cations.

4. Process of claim 1 wherein at least 40 percent of the aluminum atoms of said molecular sieve are associated with polyvalent metal cations.

5. Process of claim 1 wherein at least 10 percent of the aluminum atoms of said molecular sieve are unassociated with cations.

6. Process of claim 1 wherein at least 40 percent of the aluminum atoms of said molecular sieve are unassociated with cations.

7. Process of claim 1 wherein at least 10 percent of the aluminum atoms of said molecular sieve are unassociated with cations and at least 10 percent of the aluminum atoms of said molecular sieve are associated with polyvalent metal cations.

8. Process of claim 1 wherein less than 60 percent of the aluminum atoms of said molecular sieve are associated with monovalent cations, from 25 to 70 percent of said aluminum atoms are associated with polyvalent metal cations and at least 10 percent of said aluminum atoms are unassociated with cations.

9. Process of claim 1 wherein said catalyst is zeolite Y having no more than 90 percent of its aluminum atoms associated with monovalent cations.

10. In a process for producing cumene by alkylating benzene with propylene in the presence of an alkylation catalyst under alkylation conditions, the improvement which comprises transalkylating diisopropyl benzene to cumene by reacting in the liquid phase benzene and diisopropyl benzene in a molar ratio of at least 1:1 in the presence of a zeolitic molecular sieve catalyst having a pore size large enough to permit the internal absorption of benzene, a silica-to-alumina ratio of at least 3.0 and no more than 90 percent of aluminum atoms associated with monovalent cations at a temperature of from about 130° C. to about 250° C. and a pressure of from about 75 p.s.i.g. to about 450 p.s.i.g., and recovering cumene.

11. Process for producing cumene which comprises alkylating benzene with propylene in the presence of an alkylation catalyst under alkylation conditions, removing a major portion of cumene from the alkylation reaction effluent, combining said effluent with benzene such that the molar ratio of benzene-to-diisopropyl benzene is at least 1:1, thereafter transalkylating diisopropyl benzene in the resultant feed stream to cumene by reacting in the liquid phase diisopropyl benzene and benzene in said feed stream in the presence of a zeolitic molecular sieve catalyst having a pore size large enough to permit the internal absorption of benzene, a silica-to-alumina ratio of at least 3.0 and not more than 90 percent of aluminum atoms associated with monovalent cations at a temperature of from about 130° C. to about 250° C. and a pressure of from about 75 p.s.i.g. to about 450 p.s.i.g., and recovering cumene.

12. Process of claim 11 wherein said transalkylation reaction is carried out continuously at a catalyst factor of at least about one hour.

13. Process for producing cumene which comprises alkylating benzene with propylene in the presence of an alkylation catalyst under alkylation conditions, removing a major portion of cumene from the alkylation reaction effluent, combining said effluent with benzene such that the molar ratio of benzene-to-diisopropyl benzene is at least 1:1, thereafter transalkylating diisopropyl benzene in the resultant feed stream to cumene by reacting in the liquid phase diisopropyl benzene and benzene in the presence of a zeolitic molecular sieve catalyst having a pore size large enough to permit the internal absorption of benzene, a silica-to-alumina ratio of at least 3.0 and not more than 90 percent of aluminum atoms associated with monovalent cations at a temperature of from about 160° C. to about 170° C. and a pressure of from about 95 p.s.i.g. to about 145 p.s.i.g.

14. Process of claim 13 wherein said transalkylation reaction is carried out continuously at a catalyst factor of at least about one hour.

15. Process for producing cumene which comprises continuously alkylating benzene with propylene in a molar ratio of from about 6:1 to about 14:1 in a circulating-loop type alkylation reactor in the presence of a cation exchanging resin catalyst at a catalyst factor of at least about 0.37 hour at a temperature of from about 115° C. to about 150° C. and a pressure of from about 180 p.s.i.g. to about 225 p.s.i.g., removing a major portion of cumene from the alkylation reactor effluent, combining said effluent with benzene such that the molar ratio of benzene-to-diisopropyl benzene is at least 1:1, thereafter transalkylating diisopropyl benzene in the resultant feed stream to cumene by continuously reacting in the liquid phase diisopropyl benzene and benzene in a transalkylation reactor in the presence of a zeolite Y catalyst having not more than 90 percent of aluminum atoms associated with monovalent cations at a catalyst factor of at least about one hour at a temperature of from about 160° C. to about 170° C. and a pressure of from about 95 p.s.i.g. to about 145 p.s.i.g., and recovering cumene.

References Cited

UNITED STATES PATENTS

| | | | |
|---|---|---|---|
| 2,971,903 | 2/1961 | Kimberlin et al. | 208—119 |
| 3,173,855 | 3/1965 | Miale et al. | 208—120 |
| 3,312,615 | 4/1967 | Cramer et al. | 208—110 |
| 2,945,072 | 7/1960 | Joris | 260—671 |
| 3,140,253 | 7/1964 | Plank et al. | 208—120 |

FOREIGN PATENTS

| | | |
|---|---|---|
| 791,318 | 2/1958 | Great Britain. |

DELBERT E. GANTZ, *Primary Examiner.*

C. R. DAVIS, *Assistant Examiner.*